United States Patent
Sharp et al.

(10) Patent No.: US 7,185,315 B2
(45) Date of Patent: Feb. 27, 2007

(54) GRAPHICAL FEEDBACK OF DISPARITIES IN TARGET DESIGNS IN GRAPHICAL DEVELOPMENT ENVIRONMENT

(75) Inventors: Thomas Dean Sharp, Terrace Park, OH (US); Matthew Joseph Rensing, Cincinnati, OH (US)

(73) Assignee: Sheet Dynamics, Ltd., Cincinnati, OH (US)

( * ) Notice: Subject to any disclaimer, the term of this patent is extended or adjusted under 35 U.S.C. 154(b) by 792 days.

(21) Appl. No.: 10/374,923

(22) Filed: Feb. 25, 2003

(65) Prior Publication Data

US 2004/0168107 A1 Aug. 26, 2004

(51) Int. Cl.
G06F 9/44 (2006.01)
H03K 5/22 (2006.01)

(52) U.S. Cl. ............... 717/109; 717/113; 717/125; 327/72

(58) Field of Classification Search ........... 717/113, 717/125
See application file for complete search history.

(56) References Cited

U.S. PATENT DOCUMENTS

| | | | | |
|---|---|---|---|---|
| 4,818,931 A * | 4/1989 | Naegeli et al. | ........... | 324/76.22 |
| 5,410,648 A | 4/1995 | Pazel | ........... | 395/158 |
| 5,652,874 A | 7/1997 | Upson et al. | ........... | 395/500 |
| 5,737,622 A * | 4/1998 | Rogers et al. | ........... | 713/324 |
| 5,926,176 A | 7/1999 | McMillan et al. | ........... | 345/339 |
| 6,016,474 A | 1/2000 | Kim et al. | ........... | 705/1 |
| 6,026,362 A | 2/2000 | Kim et al. | ........... | 705/1 |
| 6,083,278 A | 7/2000 | Olson et al. | ........... | 717/2 |
| 6,118,448 A | 9/2000 | McMillan et al. | ........... | 345/339 |
| 6,189,142 B1 | 2/2001 | Johnston et al. | ........... | 717/4 |
| 6,199,199 B1 | 3/2001 | Johnston et al. | ........... | 717/4 |
| 6,484,124 B1 * | 11/2002 | MacMullen | ........... | 702/182 |
| 6,738,964 B1 * | 5/2004 | Zink et al. | ........... | 717/105 |
| 6,802,046 B2 * | 10/2004 | Coelho et al. | ........... | 716/4 |
| 6,850,735 B2 * | 2/2005 | Sugar et al. | ........... | 455/67.11 |
| 6,959,431 B1 * | 10/2005 | Shiels et al. | ........... | 717/124 |
| 2002/0013918 A1 * | 1/2002 | Swoboda et al. | ........... | 714/30 |
| 2003/0131325 A1 * | 7/2003 | Schubert et al. | ........... | 716/4 |
| 2006/0015862 A1 * | 1/2006 | Odom et al. | ........... | 717/168 |
| 2006/0058976 A1 * | 3/2006 | Ferris | ........... | 702/123 |

OTHER PUBLICATIONS

De Coster, L; Ade, M; Lauwereins, R; Peperstraete, J; "Code Generation for Compiled Bit-True Simulation of DSP Applications", p. 9-14, 1998 IEEE, retrieved Jun. 13, 2006.*

Hu, Jingxuan; McLaren, P.G; Dirks, Erwin; Wang, Pei; Bieswski, B; "A Graphical Block Platform for Real-Time DSP-Based Relay Development", p. 265-269, 2002 IEEE, retrieved Jun. 13, 2006.*

Karnofsky, Kenneth; "Speeding DSP algorithm design", p. 70-82, Jul. 1996 IEEE, retrieved Jun. 13, 2006.*

Sung, Wonyong; Kim, Junedong; Ha, Soonhoi; "Memory Efficient Software Synthesis from Dataflow Graph", p. 137-142, 1998 IEEE, retrieved Jun. 13, 2006.*

* cited by examiner

*Primary Examiner*—Mary Steelman
(74) *Attorney, Agent, or Firm*—Wood, Herron & Evans, L.L.P.

(57) ABSTRACT

An apparatus, program product and method visually represent the disparities between a target design such as a DSP program design and a reference system in connection with the display of a graphical representation of the design, specifically in association with one or more connection elements representing connections defined within the target design. By doing so, a designer, developer or tester who is working with a particular target design is better able to identify and analyze potential problems or other unexpected and/or unintended behaviors in a target design.

44 Claims, 5 Drawing Sheets

GRAPHICAL FEEDBACK OF DISPARITIES IN TARGET DESIGNS IN GRAPHICAL DEVELOPMENT ENVIRONMENT

FIELD OF THE INVENTION

The invention is generally related to computer software and graphical user interface environments for use therewith. More particularly, the invention is related to automated software tools for the use in development, testing and debugging of hardware and/or software designs.

BACKGROUND OF THE INVENTION

As the performance and complexity of computers and other electronic devices, and of the underlying electronic components utilized thereby, continues to increase, the processes of developing, testing and debugging particular hardware and/or software designs has likewise become increasingly more complex and cumbersome. Moreover, as computers and electronic devices have become more ubiquitous in many aspects of everyday life, the demand for such devices has likewise increased, as has the demand for automated tools for assisting in the development of such devices in a quicker and more cost effective manner. Shortening product life cycles, as well as market demands, have likewise necessitated shortened development cycles, which has further increased the demand for automated tools to accelerate product development.

As an example, developing software for digital signal processors (DSP's) has become increasingly important. DSP's are specialized computer chips similar in many respects to computer microprocessors; however, they are typically tailored for incorporation into products and processes, rather than general purpose computers, to make those products and processes "smart". In many instances, DSP's are geared toward real-time, low cost and/or low power consumption applications where general purpose microprocessors would not be economically or technologically viable.

DSP's are proliferating in every facet of the consumer and industrial markets, and have become the hardware engines powering the Internet, as well as many communications, wireless and entertainment products. DSP's are now used in a large percentage of consumer electronics, hearing aids, toys, appliances, cell phones, television set top boxes, automobiles and industrial applications.

DSP's typically implement advanced signal processing algorithms that perform detailed mathematical analysis and/or manipulation of input data representative of real world information. The input data is typically presented to a DSP in digital form, resulting in the generation of digital output data. The real world, however, is often analog, and not digital, in nature. As a result, some conversion between the digital domain and another domain is often required.

For example, in a digital audio system, a DSP may be used to add a reverb effect to a sound signal received from a microphone or other audio source, which is then amplified and played back over a speaker. The sound signals received by a microphone and later played back over a speaker, however, are in the form of time-varying waves of energy. A microphone typically generates a time-varying analog voltage signal in response to a sound wave, and a speaker likewise is driven by a time-varying analog voltage signal. To enable a DSP to apply a digital reverb effect, therefore, analog-to-digital conversion is required to convert the analog voltage signal from a microphone to a digital format suitable for the DSP, and digital-to-analog conversion is required to convert the digital output of the DSP to an analog format suitable for driving a speaker. For analog-to-digital conversion, an analog signal is sampled at predetermined intervals, e.g., $\frac{1}{40,000}$ of a second, resulting in the generation of a stream of numbers. Likewise, for digital-to-analog conversion, a stream of numbers is typically used to drive an analog voltage signal. However, given that only a finite number of digits can be used to digitally represent an analog value, digital values are inherently approximations of analog values. Both A/D and D/A operations are thus limited by the quality of the A/D and D/A conversion circuitry, and as a result, some inaccuracy and/or imprecision always results from the use of DSP's in an analog environment.

Often of equal or greater significance are the inaccuracies that result from conducting mathematical computations in DSP's with operand numbers that are represented with limited precision. In particular, to reduce cost and power consumption, many DSP's forego the use of floating point numbers for fixed point numbers with a limited number of bits of precision, e.g., 16, 24 or 32 bits. The rounding errors that typically result when conducting mathematical operations on limited precision numbers can be significant, even to the point of causing certain mathematical operations such as digital filters to become unstable. As a result, in some instances, a signal processing operation that produces a desirable result when simulated in a general purpose computer with comparably high precision may have unacceptably high levels of numerical noise, or may even be totally unstable, when implemented in a DSP with limited precision.

One problem facing many designers of DSP-based products is therefore ensuring that a DSP algorithm remains stable and achieves a desired result in real-world applications.

Like a general purpose computer, a DSP requires software to tailor the DSP to perform particular functions, or to implement particular mathematical algorithms. However, creating DSP software is often more difficult than creating software for a general purpose computer for a number of reasons. DSP's are typically designed to be low power and inexpensive, which can limit the memory, processing power and numerical precision available in a DSP design. In addition, many DSP applications require real-time processing, where operations are required to be performed within explicit and demanding time constraints. In some consumer audio applications, for instance, a DSP must execute its complete program cycle 48,000 times per second in order to suitably process an audio stream. These heightened requirements drive the complexity of DSP design, and consequently compound the difficulty of programming suitable software for use in a particular DSP application.

Coupled with the growth in DSP use, there has been a trend towards increasing complexity in chip designs, which also makes programming DSP software more difficult. As a result, software development has been found to be a major factor—if not the major factor—determining the time-to-market and product cost of a DSP-based design.

One fundamental difficulty associated with DSP software design is due to the fact that, in many instances, the skill sets of the individuals that are attempting to integrate DSP-based functionality into a product can be widely divergent. On the one hand, it is often the application experts on a product design team who are tasked with developing the desired algorithms to implement on a DSP, as these experts are generally skilled in the fundamental technologies for the product. On the other hand, the actual implementation of these algorithms in suitable software is often the domain of a software engineer who is better versed in software development and the capabilities of the underlying DSP hardware, but who may not be particularly well versed in those fundamental technologies. For example, in the development of a product such as the aforementioned digital audio system, an application expert for such a product would likely be well versed in sound theory and filtering algorithms, but might not be skilled in computer programming, while a DSP programmer for such a product would not necessarily have a specific expertise in sound theory or the related mathematics.

Certainly, when the individual that codes DSP software does not have a fundamental understanding of the underlying technology within which it will be used, inefficiencies arise due to the need for the involvement of an application expert in the development process. Like all software, DSP software must often be tested, debugged, and reworked before the final software is acceptable for its intended application, and in many instances, application-specific expertise is required in all of these steps. As a result, DSP software design can be burdensome, time consuming and expensive.

To address many of these inefficiencies, substantial efforts have been directed toward simplifying the design, testing and debugging of DSP software, typically through the use of software tools that automate many of the aspects of these processes. For example, as with other types of software, DSP software development has been aided by the use of graphical development environments, where graphical constructs are used to represent the various components of a DSP software program. Often, such environments permit DSP algorithms to be represented in block diagram format, with manipulation of the graphical constructs by the developer resulting in modifications to the underlying software. In addition, libraries of preexisting components may be supported, such that a developer is able to construct an algorithm predominantly by assembling together multiple preexisting components. Such a graphical user interface environment may be used in development, simulation, analysis, testing and debugging of DSP software, often resulting in substantially greater efficiency and reduced development cycles.

Moreover, the inherent intuitiveness of a graphical development environment often reduces learning curves and the required expertise in software programming. In fact, as the sophistication of automated development tools has increased, application experts have begun to assume at least some of the tasks traditionally performed by software engineers in connection with DSP-based product design.

To the extent that the tasks involved with DSP-based product design can be consolidated within a narrower skill set, faster, less expensive and more efficient development often results. In addition, given the application-specific knowledge that is nearly always required when implementing DSP technology in any product, empowerment of application experts to subsume the tasks traditionally relegated to software engineers is often highly desirable. Accordingly, a continuing need exists for automated development tools that simplify the various processes involved with developing DSP software.

As one example, designing any new device or product (DSP-based or otherwise) typically involves converting a specification or other form of "reference" system into a physical device or other implementation that satisfies the specification. The specification can be in many different forms, anything from a causal verbal description to a detailed executable computer simulation of the desired behavior. Regardless, problems arise whenever an implementation of a specification, hereinafter referred to as a "target design", does not behave as expected or desired, i.e., when the implementation departs from the specification. Identifying the source of a problem, and then remedying the problem, however, may prove difficult, particularly for complex products such as DSP-enabled products and the like.

For DSP-based products, one potential source of problems arises due to the inherent limitations of digitally representing real world information. A digital representation of an analog value is limited by the precision of the digital representation. For example, the value of Tr can be represented using differing degrees of precision, e.g., 3.142857, 3.14, 3, etc., based upon the number of digits used to represent the value. Moreover, converting an analog value to digital requires some degree of rounding to arrive at the desired precision, and as a result, at least some inaccuracy or error will always be introduced whenever an analog value is represented in digital form.

Even more significant errors can occur when conducting mathematical operations on limited precision numbers. For example, when the difference is taken between large numbers of similar value, the rounding error may be as large or larger than the correct result. Moreover, for recursive operations such as infinite impulse response filters, which are often implemented in DSP's, these rounding errors are often fed back as inputs to subsequent computations. In such instances, the errors can be amplified greatly, potentially causing the results of a mathematical operation to become unbounded and the operation to be unstable.

While in many instances, the introduced error will have negligible effect on a DSP algorithm, in other instances, e.g., where a high degree of precision and dynamic range are required, the errors can propagate through an algorithm and introduce incorrect and/or unpredictable results.

Furthermore, whenever a specification is created for a DSP-based product, often the precision used when creating the specification is greater than that which is economically and/or technologically feasible in an implementation of the specification. Thus, problems may arise in the implementation due to numerical imprecision in the implementation.

Other problems can arise due to unexpected, undocumented or undiscovered aspects of the behavior of DSP hardware, associated compilers and/or low level DSP instructions. For example, it has been found that certain DSP designs exhibit unexpected errors in the way numbers are rounded. Such designs, for example, may round computation results up to a next highest numerical representation, despite the fact that the behavior specified by the manufacturers of those designs specify that results are rounded to a nearest numerical representation.

Locating and resolving the sources of these types of problems, however, can be difficult, particularly for complex algorithms. Even when algorithms are represented by block diagrams, as used by graphical development environments, such algorithms may be represented by hundreds or thousands of blocks, each of which could be the potential source of a problem.

Conventionally, locating problems in DSP software, even via a graphical development environment, can be cumbersome, requiring sampling of individual signals and comparison of such sampled signals to expected values. Once an incorrect signal is located, a determination is then required to be made as to whether the signal is indicative of the root cause of the problem, or if it is just an artifact of a problem earlier in the signal flow, typically by iteratively backtracking through a block diagram, checking earlier signals in the signal flow, and looking for other problems. Such a process that can be extremely tedious and time consuming, particularly if a signal flow passes through hundreds of blocks. Moreover, in some instances, a feedback loop may be present in a signal flow, which may prevent identification of a root source of a problem simply through backtracking through the signal flow. Typically, these situations require more complex search strategies, most of which rely on breaking a loop and looking at specific subsets of signals in the loop.

As such, a significant need has arisen in the art for a manner of simplifying the process of debugging DSP software, and in particular DSP software developed, tested and debugged in a graphical development environment.

SUMMARY OF THE INVENTION

The invention addresses these and other problems associated with the prior art by providing an apparatus, program product and method in which disparities between a target design such as a DSP program design and a reference system are represented visually in connection with the display of a graphical representation of the design, specifically in association with one or more connection elements representing connections defined within the target design. By doing so, a designer, developer or tester who is working with a particular target design is better able to identify and analyze potential problems or other unexpected and/or unintended behaviors in a target design.

Specifically, one or more values of a signal output by a functional block in a target design are compared to one or more reference values for that signal to identify a disparity in the design. A visual representation of that disparity is then provided in association with a connection element that represents the signal path over which the signal is output by the functional block.

A disparity may be visually represented in a number of manners, as will be discussed in greater detail below. For example, in some embodiments, various colors, line thicknesses, patterns, etc. may be applied to the various connection elements displayed in a graphical representation of a target design to represent the relative magnitudes or types of disparities in a target design from a reference system. Thus, through simple visual inspection of the graphical representation, a developer may identify those connections, or signal paths, that depart the most significantly from the expected results, so that initial attention can be directed to those functional blocks that drive the questionable connections.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter utilize graphical visualizations to facilitate debugging target designs such as DSP programs and the like that are developed within a graphical development environment. By doing so, a graphical user interface may take advantage of the user's perceptual ability to search a graphical representation of a target design for useful debugging information.

While the invention will be discussed hereinafter in the context of development of DSP software, it will be appreciated that the invention may have applicability in other environments utilizing graphical depictions of target designs, e.g., in the development of other forms of software, including embedded and non-embedded software, the development of hardware, the concurrent development of hardware and software, etc. With respect to the design of hardware, for example, development environments are available that can take a high level block diagram and translate it into a high level Hardware Description Language (HDL) such as VHDL. Moreover, tools are available that can take high level signal flow information descriptions and create actual hardware designs that can implement those descriptions. As such, the principles discussed herein also have applicability in such hardware-based systems.

Moreover, the invention will hereinafter be discussed in the context of an integrated graphical development environment in which development, testing, simulation, and debugging functionality is supported within the same general environment. However, it will be appreciated that a graphical development environment consistent with the invention may incorporate only a subset of this functionality, e.g., a graphical development environment consistent with the invention may only include debugging, testing and/or simulation functionality, and may process pre-existing target designs developed in other environments. The invention is therefore not limited to the specific implementations discussed herein.

Technological Overview

In general, the herein-described embodiments rely on a reference system that is used to identify potential problems in a target design. A reference system may take any of several forms, including but not limited to, a specification of the system behavior, a simulation of the system behavior, limits graphically displayed on a plot of a transfer function, an implementation of the embedded software of interest in an alternate processor with different numerical precision capabilities, etc. For the case of a simulation implementation of a reference system, such an implementation may be depicted using the same graphical development tool as that used to depict a target design. Otherwise, various specifications may be used to define the expected or desirable behavior of a target design.

As such, whenever it is desirable to debug a target design in the manner described herein, a suitable reference system should be selected. Then, once a suitable reference system has been established for reference measurements, testing may be performed to return two sets of data; reference and target (or actual).

For example, in a specific embodiment of the invention described hereinafter, a graphical development environment is specifically suited for developing, debugging and testing DSP software capable of executing on a particular hardware platform. As is well known in the art, due to limits in precision, accuracy, hardware capabilities, etc., DSP software, once designed, may not perform in its intended manner when executed on its intended hardware platform. Thus, to address this concern, it may be desirable to compare the operation of the DSP software when executing on specific hardware to the intended operation, as represented by a reference system.

Embodiments consistent with the invention may perform such a comparison through the generation of reference and target data that respectively represent intended and actual performance of the DSP software. The reference data may be generated, for example, by generating reference values for each signal of interest using a reference system (e.g., a simulation), with the reference values represented, for example, by a sequence of numbers. A corresponding set of target data, again including sequences of numbers (or target values) may then be generated and captured during execution of the DSP software on an actual hardware (target) system. If the target data is generated via simulation, typically a "bit-true" simulator (i.e., a simulation program), which is often made available by a manufacturer of a particular DSP platform to test DSP program code intended for that manufacturer's DSP's, is used.

Once such data has been generated, it is desirable to select a manner of comparing the disparities, or differences in the results between the reference and target systems. In some cases, the signals may be nearly identical, and may not be significant to the final operation of the target design. In other cases, however, the differences may be so large as to result in unstable or otherwise unsatisfactory results. As such, in many embodiments, it may be desirable to identify not only the presence of a disparity between signals in reference and target systems, but also to identify the relative magnitude, type and significance of such disparities.

Any number of known manners of comparing differences between signals may be used to identify the magnitude and/or type of disparities between reference and target systems, e.g., various time domain techniques and frequency domain techniques. Using time domain techniques, for example, each sample of a reference signal may be compared to a corresponding value of a target signal, and based on these individual comparisons, an overall signal difference can be computed using various mathematical techniques, including but not limited to various statistical techniques. The disparities may also be represented based upon one or more of peak errors, mean errors, standard deviations, etc. Moreover, the differences may be represented as absolute values, relative values, values relative to a dynamic range, etc.

Frequency domain techniques may alternatively be used to compare the frequency content of reference and target signals. In this case, both the reference and target signals may be converted into some frequency domain form (e.g., power spectral density) so that the resulting spectrums could be compared using the same types of techniques used for the time domain approach.

In other embodiments, comparisons of different operations (or transfer functions) of blocks may be accomplished by using the input and output signals of individual blocks to model their behavior, both for the reference system and the target system. The resulting models could then be examined. For example, a non-parametric transfer function could be estimated for both a reference and a target system, whereby disparities may be identified through comparison of the resulting transfer functions.

Once reference data and target data is compared, the results of these comparisons may be used to highlight, or visually represent, any disparities between the reference and target data. Such highlighting desirably allows a user to quickly identify areas of concern, where the reference and target data departs to a significant extent.

For example, in the herein-described DSP software embodiment, such highlighting may be made in association with the connection elements displayed in a block diagram, i.e., the graphical representations of the connections between the functional blocks in a diagram. It is generally over these connections that output values are passed from functional block to functional block, and as such, it is typically the values output over these connections that are of interest in debugging the operation of DSP software. In this regard, within the context of a DSP software embodiment, a "functional block" may be considered to represent a block of DSP program code that either generates one or more data variables that may be passed to another functional block and/or receives one or more data variables, e.g., which are passed from another functional block. Similarly, a "connection element" may be considered to represent one or more connections, or signal paths, over which data in a DSP program is passed from one functional block to another, e.g., to pass one or more variables, data saved on a stack, one or more return values for a function, etc. It should also be noted that a connection element may represent multiple signal paths, and that a disparity in the data from one, some or all of the signal paths represented by a connection element may be visually represented on that connection element.

Typically, any number of manners of applying highlighting may be used to visually represent the disparities between target and reference values output over a particular connection. For example, display attributes of a connection, e.g., the display color, the thickness, the intensity and/or the display pattern may be varied to represent relative disparities. In addition, certain attributes may be modulated in an on-off or blinking manner to indicate certain aspects of the disparities. Rather than or in addition to controlling the display attribute of a connection element, graphical icons, text, arrows, etc. may be displayed adjacent to a connection element to highlight a disparity. The attributes of these graphical icons, text, arrows, etc. may also be varied to communicate additional information regarding disparities. In addition, highlighting may be based upon absolute or relative disparities, e.g., for the former, by displaying actual error percentages, or for the latter, by choosing colors that represent relative ranges of errors. Highlighting may also be based upon the type of disparity, e.g., disparities may be identified as correlated disparities such as time shifts or amplitude scaling, as DC offsets between signals or as uncorrelated noise due to numerical effects. Furthermore, it may also be desirable to include a color bar or other form of legend to provide feedback to a user as to the meaning of certain highlighting. For example, a color bar may be composed of a set of colored blocks stacked into a column, with the order that the colors appear in the bar corresponding to ranges of potential differences, e.g., with red representing the largest differences, gray or green the smallest.

As will also become more apparent below, it may be desirable to permit a user to obtain additional debugging information in response to user input. For example, where the functional blocks within block diagrams are capable of representing groups of underlying blocks and connections, it may be desirable to permit a user to "drill down" through a diagram to see errors at progressively finer levels of detail. In addition, it may be desirable to permit a user to select a block or connection element in a diagram to obtain additional data, e.g., an absolute error magnitude, or to select additional analysis functions, e.g., plotting errors, reference data and/or target data vs. time on a graph.

In addition, it may be desirable to permit a user to select an option (e.g., from a graphical menu that is displayed when right clicking on a connection that exhibits a disparity) to conduct automatic analysis to determine the type of disparity. The target and reference signals may be correlated to determine if the disparity is due to a time shift, an amplitude scaling change or a more complicated linear transformation rather than to numerical noise. Other analysis can be performed such as comparing mean values to determine if there is a DC offset between signals. The analysis may be conducted over a time period to determine if the disparity is constant over time or if it is an occasional event such as a signal spike that briefly causes a disparity between the target and reference signals that otherwise does not exist.

When comparing reference and target signals, another important issue to address in some embodiments is the differences that arise over time. In some environments, for example, reference and target signals may initially track one another relatively closely, but may depart significantly over time. In DSP software design, for example, digital filters often exhibit such behavior due to the instability that can arise when the numerical representation used to represent filter coefficients does not have sufficient precision.

To address this issue, animation may be used in some embodiments to display how an error developed over time through the diagram of a target system. However, in other embodiments, no animation may be used, with static colors or other highlights used to represent errors at a specific time, or as averaged over a specific period of time.

In many DSP software designs, for example, it may be desirable to show how signal differences for the outputs of functional blocks evolve over time. In a feedback loop, for example, it may be difficult to determine the root source of a problem since a problem occurring anywhere in a loop could quickly propagate throughout the entire loop. It has been found that in some instances a problem does not occur in the first time through a loop, but maybe the tenth time through the loop. This characteristic adds an extra dimension to the problem of debugging a signal processing program. Rather than just showing changes with a signal over time, it may be necessary to show where those changes occur on the same path over time in a loop. In such instances, it may be desirable to permit the display of a graphical representation of a feedback loop to be multi-layered with respect to time.

For example, one solution to this problem would be to show the evolution of block behavior by capturing the inputs of each block in the actual loop and comparing those inputs to the input/output, or I/O, relationships in the blocks of a reference system. This method could be constructed, as an alternative mode of testing a user could select once a problem has been isolated to a particular feedback path. In such an instance, a second reference model could be used that would execute the functions of each individual block in a loop based on the targeted outputs for each block. Then, a comparison could be made to block outputs on the actual system. Differences could then be located in the I/O relationships, or transfer functions, of the actual blocks. Blocks could then be highlighted where the actual system's transfer functions differ from the reference system.

Since a common artifact of implementing mathematical operations with limited numerical precision is the addition of numerical noise, the transfer functions of individual blocks in the target may remain unchanged from those of the reference system, however the target blocks may be adding numerical noise to the output signal. Accordingly the input and output signals associated with blocks in the target system can also be analyzed to determine not only the transfer function of the block but the amount of noise added to the output signal.

Other modifications will be apparent to one of ordinary skill in the art having the benefit of the instant disclosure.

DSP Software Graphical Development Environment

Figure 1:
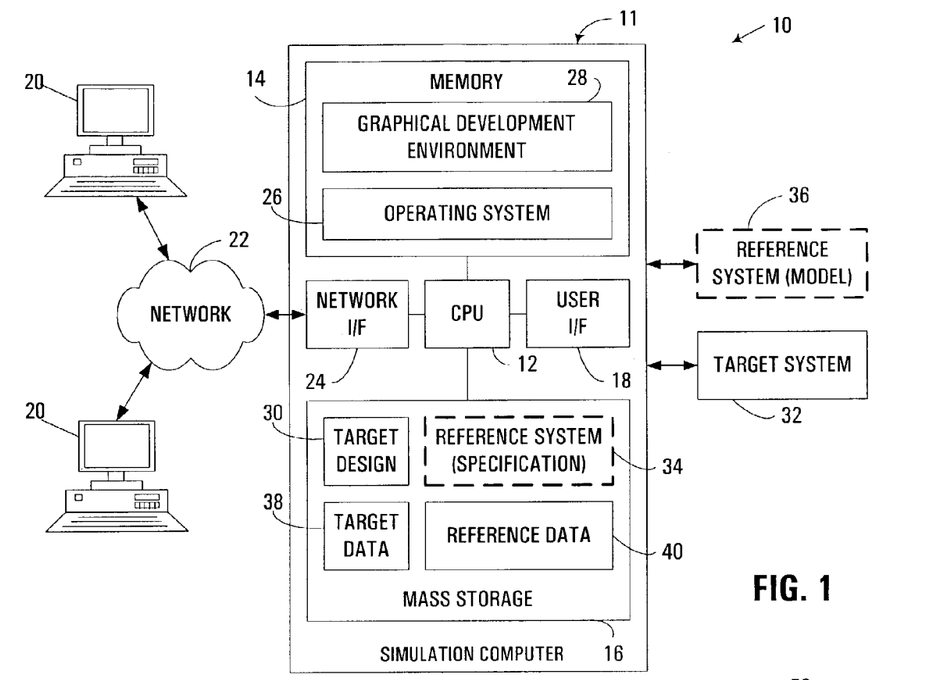
FIG. 1 is a block diagram of a computer system incorporating a graphical development environment consistent with the invention.

Turning now to the Drawings, wherein like numbers denote like parts throughout the several views, FIG. 1 illustrates a computer system 10 suitable for hosting a DSP software graphical development environment consistent with the invention. System 10 includes at least one apparatus, e.g., a simulation computer 11, which may represent practically any type of computer, computer system or other programmable electronic device capable of hosting a graphical development environment. Moreover, computer 11 may be implemented using one or more networked computers, e.g., in a cluster or other distributed computing system. Computer 11 typically includes a central processing unit 12 including at least one microprocessor coupled to a memory 14, which may represent the random access memory (RAM) devices comprising the main storage of computer 11, as well as any supplemental levels of memory, e.g., cache memories, non-volatile or backup memories (e.g., programmable or flash memories), read-only memories, etc. In addition, memory 14 may be considered to include memory storage physically located elsewhere in computer 11, e.g., any cache memory in a processor in CPU 12, as well as any storage capacity used as a virtual memory, e.g., as stored on a mass storage device 16 or on another computer coupled to computer 11.

Computer 11 also typically receives a number of inputs and outputs for communicating information externally. For interface with a user or operator, computer 11 typically includes a user interface 18 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal, e.g., via a client or single-user computer 20 coupled to computer 11 over a network 22. This latter implementation may be desirable where computer 11 is implemented as a server or other form of multi-user computer. However, it should be appreciated that computer 11 may also be implemented as a standalone workstation, desktop, or other single-user computer in some embodiments.

For non-volatile storage, computer 11 typically includes one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 11 may also include an interface 24 with one or more networks 22 (e.g., a LAN, a WAN, a wireless network, and/or the Internet, among others) to permit the communication of information with other computers and electronic devices. It should be appreciated that computer 11 typically includes suitable analog and/or digital interfaces between CPU 12 and each of components 14, 16, 18, and 24 as is well known in the art.

Computer 11 operates under the control of an operating system 26, and executes or otherwise relies upon various computer software applications, components, programs, objects, modules, data structures, etc. Moreover, various applications, components, programs, objects, modules, etc. may also execute on one or more processors in another computer coupled to computer 11 via a network, e.g., in a distributed or client-server computing environment, whereby the processing required to implement the functions of a computer program may be allocated to multiple computers over a network.

Specifically, as shown in FIG. 1, a graphical development environment 28 is shown resident in memory 14, for use in developing, testing and debugging a target design 30, shown resident in mass storage 16. As will become more apparent below, environment 28 includes functionality for comparing the operation of the target design 30 on a target system 32 (e.g., the intended hardware upon which the DSP software will ultimately execute) with that of a reference system, either taking the form of a specification, as shown at block 34, or of a model, as shown at block 36. The model 36 may be implemented on a specific hardware platform that is external to computer 11, or may be a simulation that is resident within computer 11. Captured data from target system 32 and optionally reference system 36 may occur via direct electronic communication with computer 11 (as shown in FIG. 1), or via separate manual or automatic data entry as a result of testing on a separate system that is unconnected to computer 11.

The comparison between the target design and the reference system as performed by environment 28 generally incorporates the generation of target data 38 and reference data 40. From this data, a graphical representation of target design 30 can be annotated on a computer display so as to visually represent the disparities between the target and reference data.

In the illustrated embodiment, environment 28 is based upon the Simulink and MATLAB tools available from The MathWorks, Inc. However, it will be appreciated that environment 28 may be based upon a wide variety of alternate underlying platforms, so the invention is not limited to this particular environment.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
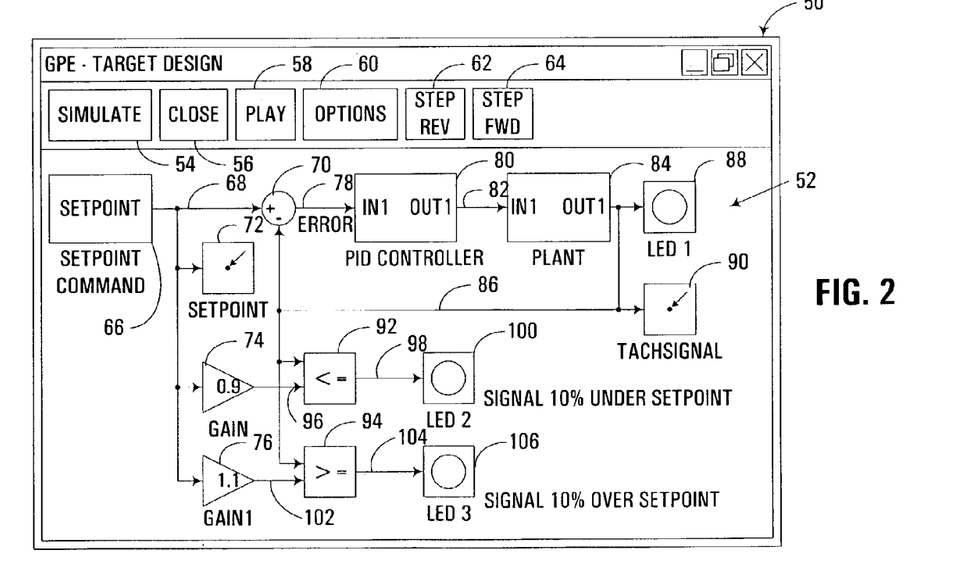
FIG. 2 is a block diagram of a display window for the graphical development environment of FIG. 1, displaying an exemplary target design.

FIG. 2 illustrates an exemplary window 50 displayed by graphical development environment 28 during development and simulation of an exemplary target design, represented in graphical form by block diagram 52. As shown in FIG. 2, window 50 may include a plurality of controls, e.g., buttons 54, 56, 58, 60, 62 and 64, as well as additional controls (not shown) such as menus, dialog boxes, pop-up menus, etc. In addition, the controls available to a user can vary by context, e.g., to display appropriate controls for simulation and development based upon what phase of the development process a user is currently undertaking. Moreover, it will be appreciated that operations such as development and simulation may occur in separate windows, and as such, the invention is not limited to this particular graphical user interface.

As is well known in the art, graphical programming typically involves representing desired behavior as a picture. As shown in FIG. 2, the exemplary block diagram 52 includes a plurality of blocks that represent the execution of specific functions, with the blocks coupled together by connections or lines, each of which representing a signal or series of numbers output by certain functional blocks and fed as inputs to other functional blocks. The connections typically contain arrows to illustrate the direction of signal flow, with the sum result of the blocks and connections illustrating the overall transformation of input signals into output signals.

Graphical programming often provides substantial flexibility and ease of use for developers, and often enables developers who are not intimately familiar with software programming to express desired algorithms through the assembly of simple building blocks. Often, blocks are selected from libraries of standard blocks, which themselves can be extended or modified to add custom features to a library.

The exemplary software design represented by block diagram 52 represents a simplified closed loop control system where a control parameter (such as a rotational speed) of a plant system such as a DC motor is driven toward a set point, with an LED indicator driven whenever the control system is active, and with a pair of variable indicators respectively displaying the current set point and speed of the plant system. Additional functionality is also included to light additional LED indicators when the speed falls outside of a range around the set point.

Specifically, a set point command block 66 outputs a set point value over a connection 68 to the positive input of a difference block 70, a variable indicator or gauge block 72, and a pair of multiplier blocks 74, 76. The output of difference block 70 represents an error signal that is fed over a connection 78 to a Proportional-Integral-Derivative (PID) controller block 80, which outputs over a connection 82 to a plant block 84, representing some real-world system to be controlled (e.g., a DC motor). Blocks 80 and 84 represent a hardware control system used to control the rotational speed, for example, of the plant system by minimizing the error signal on connection 78.

Block 84 outputs over a connection 86 to an LED indicator block 88, a variable indicator block 90, the negative input on difference block 70 and a pair of comparison blocks 92, 94.

Block 92 compares the output of block 84 with an output of multiplier block 74 on a connection 96, asserting a signal on connection 98 to drive an LED indicator block 100 whenever the output of block 84 is less than or equal to the output of multiplier block 74. Likewise, block 94 receives as a secondary input an output of multiplier block 76 over a connection 102, and asserts a signal on connection 104 to drive an LED indicator block 106 whenever the output of block 84 is greater than or equal to the output of multiplier block 76.

The gains for blocks 74 and 76 are respectively set to generate outputs that are 10% below and above the set point selected by block 66, such that indicators 100 and 106 are respectively driven whenever the output of block 84 falls below or above the set point by a magnitude greater than or equal to 10%.

It will be appreciated that block diagram 52 is merely exemplary in nature, and that in practice, a block diagram may constitute hundreds or thousands of blocks and connections.

While a wide variety of other controls may be provided to a user, buttons 54–64 illustrate a number of exemplary controls that may be provided to a user during simulation in the illustrated embodiment. Simulate button 54, for example, may be used to initiate simulation and/or capture of data for a target design (and optionally, a simulation of a reference system as well). Close button 56 may be used to exit a simulation mode and return to development. Play button 58 may be used, for example to initiate a play back of a visual indication of the disparities between the target and reference data over time. Options button 60 may be used to invoke a dialog box to select various simulation and/or animation options. Step reverse and step forward buttons 62, 64 may be used to step backward and forward in time to display the disparities between reference and target data at different points of the simulation. Additional buttons may also be provided to perform additional functions, and as will be described in further detail below. In addition, various items depicted in window 50 may be selected by a user to obtain additional information and/or to generate additional simulation data.

Figure 3:
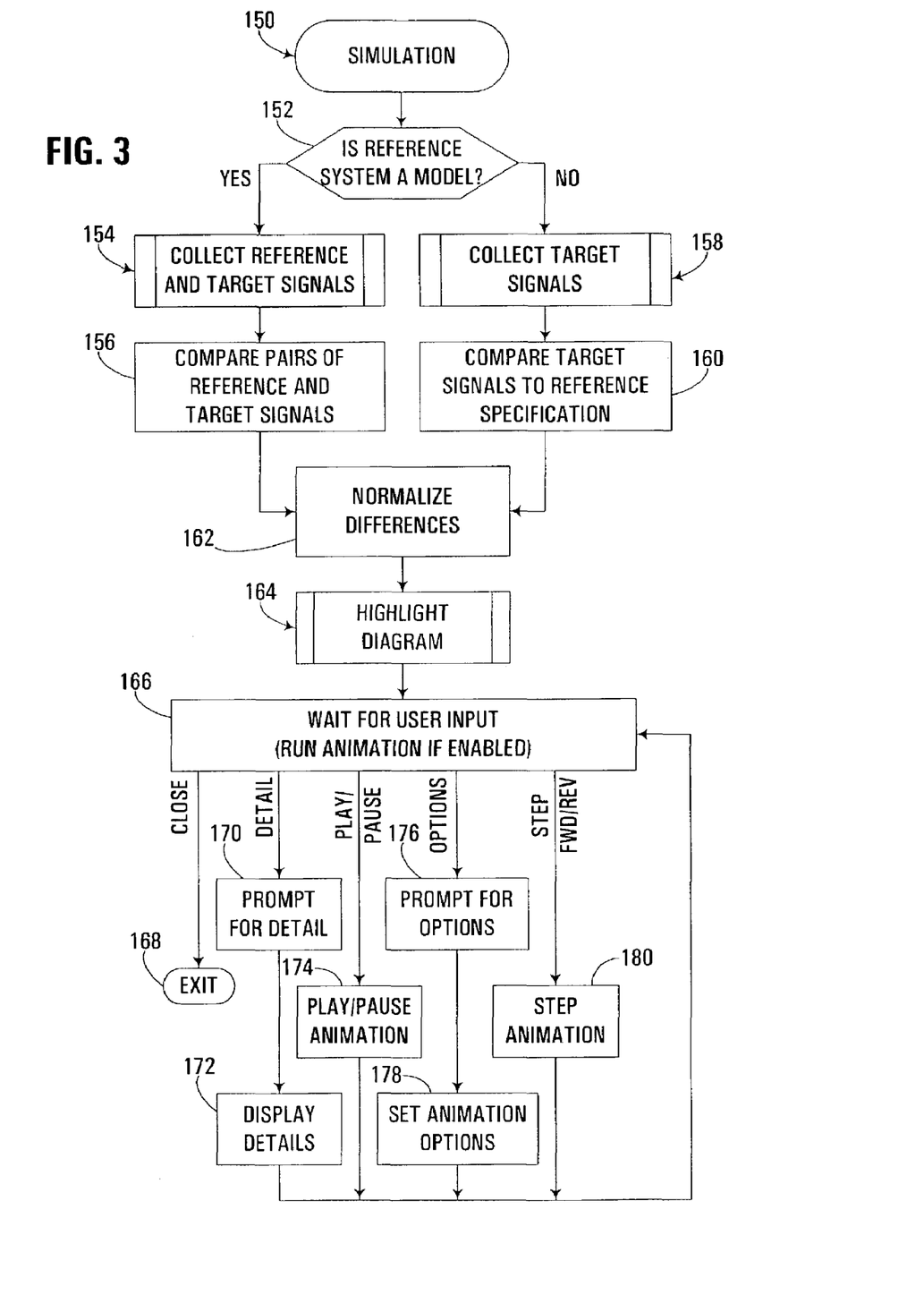
FIG. 3 is a flowchart illustrating the program flow of a simulation routine executed by the graphical development environment of FIG. 1.

FIG. 3 next illustrates a simulation routine 150 which may be initiated, for example, by environment 28 in response to user selection of simulate button 54 of FIG. 2. Routine 150 begins in block 152 by determining whether the reference system with which a target design is to be compared is a model, i.e., is either a simulatable reference system or an actual hardware reference system from which signals may be captured.

If the reference system is a model, block 152 passes control to block 154 to call a routine to initiate collection of data for both reference and target signals. Control then passes to block 156 to compare pairs of reference and target signals to identify the disparities between the reference and target signals according to a desired criteria, e.g., based upon time or frequency domain differences, and using any of the aforementioned statistical or analytical techniques for quantifying the disparities in an appropriate manner for display to a user.

Returning to block 152, if the reference system is not a model, but is rather, for example, a specification, block 152 passes control to block 158 to call a routine to collect target signals from the target design. Control then passes to block 160 to compare the target signals to the reference specification. In this instance, a user provided specification routine may be required to perform an accurate comparison of the target signals to the reference specification. Implementation of such a routine would be well within the abilities of one of ordinary skill in the art having the benefit of the instant disclosure.

Regardless of whether the reference system is or is not a model, upon comparison of the target signals to either reference signals or a reference specification, blocks 156 and 160 each pass control to block 162 to normalize the differences using any number of available statistical techniques. For example, the differences in the target signals from the anticipated values for a reference system may be normalized to a fixed scale, e.g., 100% for identical signals, 0% for completely different signals. Other manners of assigning differences or disparities to various levels within a selected dynamic range of disparities may be used in the alternative. In addition, analysis may be conducted, either automatically or in response to the user selecting this option from a pop-up menu, to determine information about the type of disparity, e.g., whether it is a time shift, amplitude scaling, a DC offset, a more complicated linear transformation, a nonlinear transformation or the addition of uncorrelated noise to the target signal.

Once the differences are normalized, block 162 passes control to block 164 to call a highlight routine to highlight the block diagram and graphically represent these differences in association with each of the connections in the block diagram, e.g., on or in close proximity to the connection elements displayed in the graphical representation thereof. Once the diagram is highlighted, control then passes to block 166 to wait for user input, which may incorporate periodically advancing an animation if enabled by a user. The user input received in block 166 may take a number of forms. For example, if a request is to close the simulation window, control may pass from block 166 to block 168, terminating routine 150. On the other hand, if a user requests additional detail regarding a particular connection or block in the block diagram (e.g., by clicking on the display element with a pointer), control may pass to block 170 to optionally prompt the user for the specific type of additional detail requested thereby (e.g., a plot or graph of specific details regarding the simulation of a particular block or connection, or information about the type of disparity existing between the corresponding signals in the target design and reference system). Once prompted, the desired details may be displayed in block 172, with control returning to block 166 to wait for additional user input. In the alternative, details may be displayed without any separate selection by a user, or a default level of detail shown could be set for the system in a preference dialog box.

A user may also select to play or pause an animation, which results in execution of block 174 to toggle between play and pause modes for the animation, if enabled. When paused, the animation is not advanced while block 166 waits for user input. When enabled, however, the animation will proceed at predetermined intervals while block 166 waits for user input.

In response to selection of a request to change options, block 176 may be executed to prompt the user to select specific options. Once those options are selected, control may pass to block 178 to set those options as requested by the user. For example, various animation options such as animation speed, display colors, etc., may be configurable by a user. In addition, other options, such as simulation options, may be selected in this manner.

Additional input that may be received from a user includes requests to step forward or back in an animation, e.g., when the animation is paused. Such input may result in the execution of block 180 to step the animation forward or back, resulting in the display of disparities between target and reference systems at an earlier or later point in time. As such, it will be appreciated that block 166 typically has functionality to modify the highlighting of the block diagram based upon the current point in time at which the display is animated.

It will be appreciated that other functionality may be provided to a user for interacting with a block diagram during simulation consistent with the invention.

Figure 4:
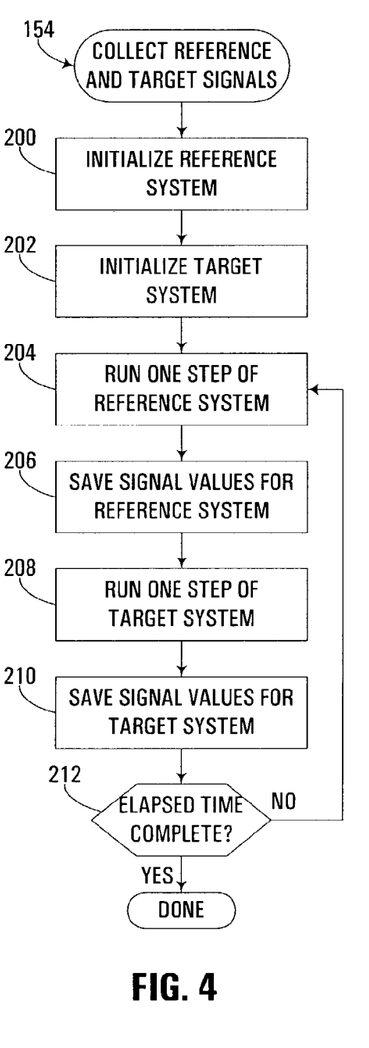
FIG. 4 is a flowchart illustrating the program flow of the collect reference and target signals routine referenced in FIG. 3.

Next, turning to FIG. 4, collect reference and target signals routine 154 is illustrated in greater detail. As noted above, routine 154 is called to collect reference and target signals during simulation when the reference system is a model. It is anticipated that, in this instance, both the reference and target systems may be simulated at a plurality of time steps, with values of the various signals output by the functional blocks in those systems captured at each point in time. As such, routine 154 generally operates by initializing the reference and target systems in blocks 200 and 202, followed by initiation of a loop to run one step of the reference system at block 204 and save all relevant signal values for the reference system at block 206. Corresponding values for the target system are then obtained by running one step of the target system at block 208 and saving the appropriate signal values therefor at block 210. Control then passes to block 212 to determine whether the elapsed time for simulation is complete. If so, routine 154 is complete. Otherwise, control returns to block 204 to run another step of the simulation of the reference and target systems.

Figure 5:
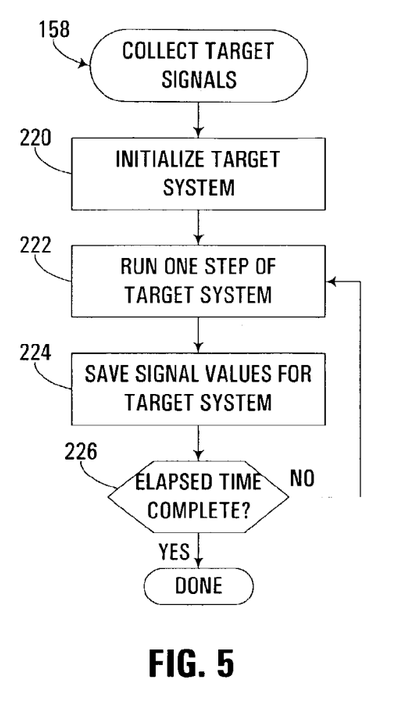
FIG. 5 is a flowchart illustrating the program flow of the collect target signals routine referenced in FIG. 3.

Now turning to FIG. 5, when the reference system is not a model, but is instead a specification, routine 158 is called to collect only the target signals in a manner similar to the collection of target signals in routine 154. Specifically, routine 158 begins in block 220 by initializing the target system, followed by executing a loop beginning at block 222, where a step of the target system is run or simulated, and appropriate signal values for the target system are captured in block 224. As long as the elapsed time for the simulation is not complete, block 226 will then return control to block 222 to simulate another step of the target system. Otherwise, once the elapsed time is complete, block 226 terminates routine 158.

It will be appreciated that various parameters, such as the total elapsed time, the number of steps, the elapsed time between steps, etc., may be configured by a user. Moreover, the initialization of target and/or reference systems, as well as the actual capture of data for specific signals, may vary in different embodiments. For example, for DSP software, a hardware test bed may be used to capture electronic signals from various points in a circuit design after advancing a circuit a predetermined number of steps in time (e.g., via a probe, a JTAG boundary scan, or via other forms of data sampling). As another example, variable step sizes may be used to capture data. For other environments, other manners of simulating and/or capturing data may be used in the alternative.

Figure 6:
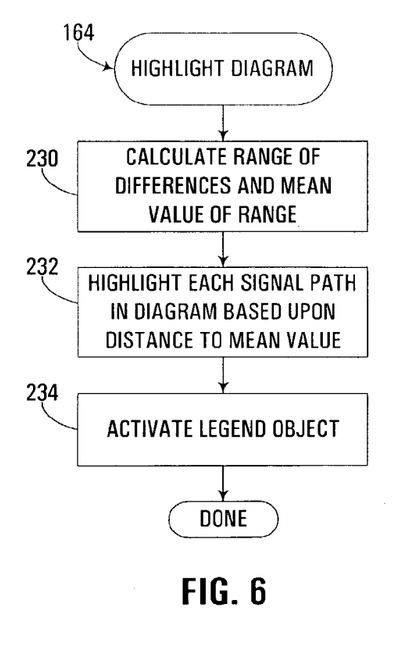
FIG. 6 is a flowchart illustrating the program flow of the highlight diagram routine referenced in FIG. 3.

FIG. 6 next illustrates highlight diagram routine 164 in greater detail. In the illustrated embodiment, routine 164 begins in block 230 by calculating the range of differences within the compared reference and target data, as well as a mean value of the range, and optionally, information about the type of difference. From this mean value, disparities may be grouped into sets of disparities having similar relative distances to the mean value, with common highlighting attributes assigned to each set or grouping. Next, block 232 highlights each signal path in the diagram based upon its relative distance to the mean value. In addition, in block 234, a legend object may be activated on the display to facilitate an understanding of the meaning of the highlighting of each signal path or connection to a user.

Figure 7:
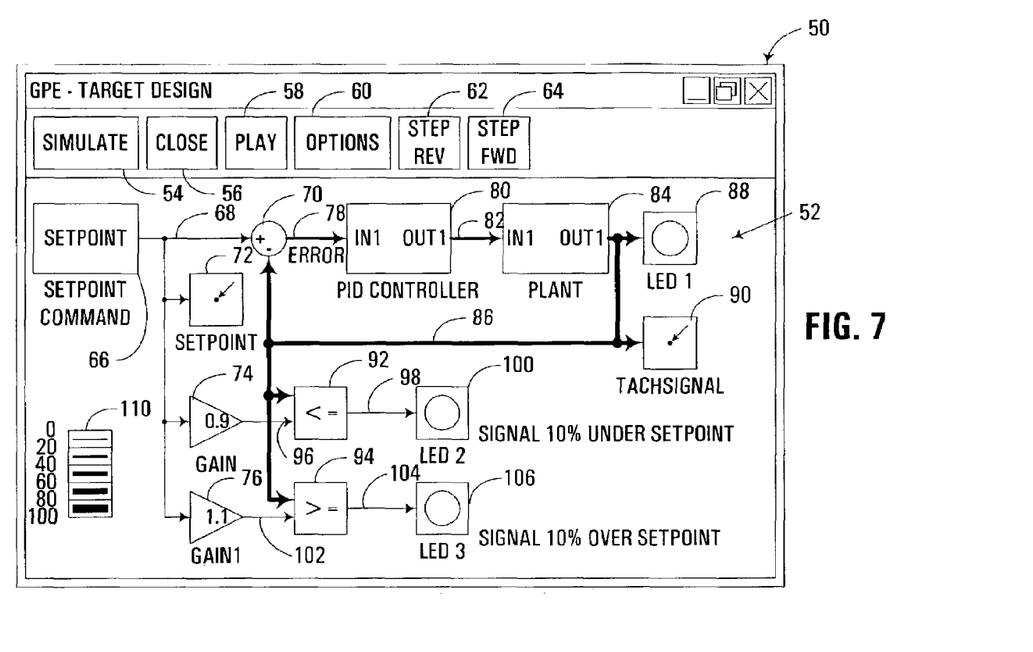
FIG. 7 is a block diagram of the display window of FIG. 2, after highlighting the exemplary target design subsequent to simulation thereof.

As discussed above, for example, connections or signal paths may be highlighted using different colors, different patterns, different line thicknesses, etc. As shown in FIG. 7, for example, highlighting via different line thicknesses is illustrated subsequent to simulation, where connections 68, 96, 98, 102 and 104 are illustrated as having relatively low disparities, connections 78 and 82 are illustrated as having relatively moderate disparities, and connection 86 is illustrated as having a relatively high disparity. These relative disparities are clarified to the user by the display of legend 110. As illustrated in FIG. 7, legend 110 may represent five different ranges of disparities with the range from 0–19% representing the least disparity, and thus the thinnest line width, and with each range represented by progressively thicker line widths, up to the thickest line width for the greatest disparity range between 80–100%.

As configured, a user, upon running a simulation, is able to identify readily, due to the relative line thicknesses of the various connections, where the target design departs most radically from the reference system, such that debugging efforts may initially directed to these areas.

Figure 8:
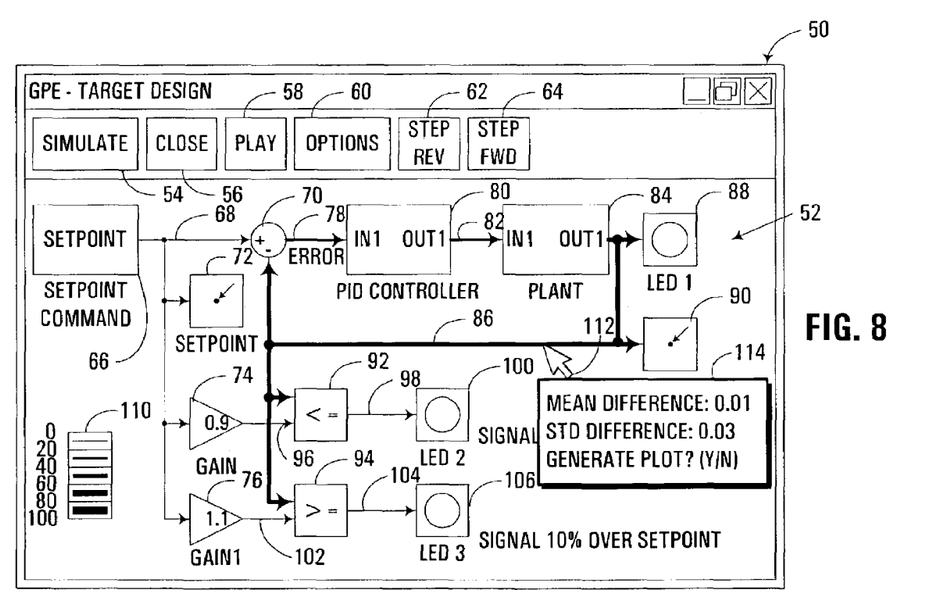
FIG. 8 is a block diagram of the display window of FIG. 7, after user selection of a connection in the exemplary target design.
Figure 9:
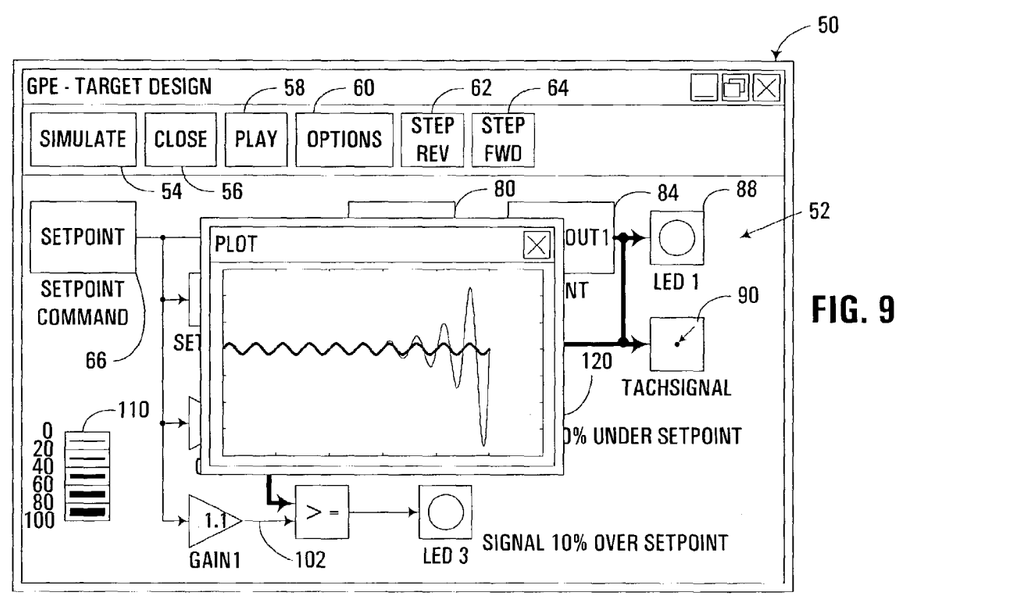
FIG. 9 is a block diagram of the display window of FIG. 8, after user request to display a plot of the signal data for the selected connection in the exemplary target design.
Figure 10:
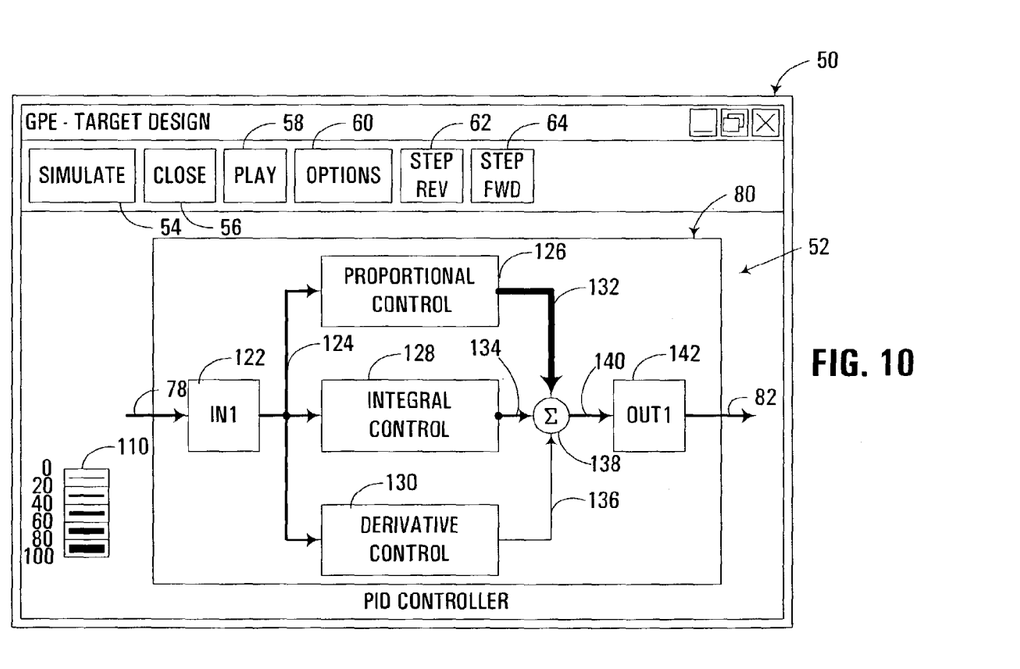
FIG. 10 is a block diagram of the display window of FIG. 7, after user selection of the PID controller block in the exemplary target design.

Additional functions supported by environment 28 are represented in FIGS. 8–10. For example, as shown in FIG. 8, it may be desirable in certain instances to select particular connections or blocks to obtain additional details about the simulation data. FIG. 8 specifically illustrates a pointer 112 directed to connection 86, which upon selection by the user results in the display of a context menu 114 displaying the mean and standard differences for the reference and target values for this signal. In addition, menu 114 offers to permit a user to generate a plot of the data over time. As shown in FIG. 9, selection of this option by the user may result in the display of a graph 120 showing the target and reference data and the disparities between the target and reference data for that signal over time. Other forms of graphs, as well as various reports and other data may also be displayed to a user in this manner.

Next, as illustrated by FIG. 10, in some instances it may be desirable to permit a user to "drill-down" through a diagram to display simulation data at finer levels of granularity. For example, upon user selection of PID controller block 80, the components within block 80 may be displayed by zooming block diagram 52. For example, a PID controller block may include an input block 122 that outputs over a connection 124 to proportional, integral and derivative control blocks 126, 128 and 130. The control blocks may respectively output over connections 132, 134 and 136 to a summer block 138, the output of which is passed via a connection 140 to an output block 142. As shown in the figure, the internal connections 124, 132, 134, 136 and 140 within block 80 may therefore be highlighted in the manner described above to provide a user with an indication of the internal disparities within the block. A user may thus be permitted to progressively drill-down or up in the block diagram to attempt to isolate potential causes of such disparities.

Furthermore, it may be desirable in some implementations to visually distinguish a block to indicate that one or more disparities exist internally in a block, irrespective of whether any disparities exist externally from that block (e.g., irrespective of whether any disparities are detected in any outputs of the block). By doing so, a user may be alerted to a need to drill-down into the block to analyze its internal components. The manner in which a block may be visually distinguished may vary for different applications. For example, different colors, highlights, icons, etc., may be used to indicate that a block incorporates internal discrepancies.

Figure 11:
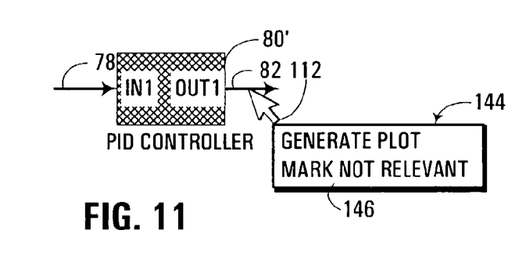
FIG. 11 is a block diagram of the PID controller block of FIG. 7, after another type of user selection of the PID controller block.

FIG. 11, for example, illustrates an alternate representation 80' of the PID controller block, which is shaded to indicate the presence of an internal disparity in the block. As noted above, even if no disparity exists on any output of the block, the alternate representation 80' may be displayed to indicate a need to investigate the internal subcomponents of that block.

In a similar manner, for connection elements that represent multiple signal paths, distinct visual representations may be used to indicate that only a portion of the signal paths have experienced discrepancies. By doing so, a user may also be permitted to select a connection element to graphically or textually represent the multiple signal paths, and to indicate the discrepancies detected in some or all of such signal paths.

Various modifications may be made to the illustrated embodiments without departing from the spirit and scope of the invention. For example, users may be permitted to select individual blocks or connections upon which to run simulation, such that only those selected components will be simulated with reference and target data generated therefor. The manner in which individual blocks or connections are simulated may also be individually selectable by a user, e.g., to analyze certain signals in the frequency domain concurrently with the analysis of other signals in the time domain. In addition, sampling of signals may be continuous or non-continuous in nature, or may include statistical sampling.

It also may be desirable to permit a user to ignore certain discrepancies that are identified in the manner described above, e.g., through a context sensitive menu. For example, as shown in FIG. 11, if a user looks at a particular discrepancy that has been identified during analysis, and determines that the discrepancy is not a concern, the user may be permitted to notify the tool as such, e.g., by opening a context-sensitive menu 144 through selection of the connection element associated with the irrelevant discrepancy (here element 82), then selecting a "mark not relevant" function 146 displayed on the menu. In such an event, the tool may override the display of a connector associated with that discrepancy to indicate that no discrepancy exists. Users may also be permitted to annotate connectors and/or blocks to permit discrepancies to be better described, or for other purposes, e.g., to permit irrelevant discrepancies to be further explained.

Other modifications may be made to the illustrated embodiments, as will be appreciated by one of ordinary skill in the art having the benefit of the instant disclosure. Therefore, the invention lies in the claims hereinafter appended.

What is claimed is:

1. A method of debugging a digital signal processor (DSP) program in a graphical development environment, the method comprising:
   (a) displaying a graphical representation of at least a portion of a target design of the DSP program on a computer display, wherein the target design includes a plurality of functional blocks coupled to one another by a plurality of connections, and wherein the graphical representation includes a plurality of block elements and a plurality of connection elements respectively representing functional blocks and connections in the target design;
   (b) generating for the target design of the DSP program, target data representative of a plurality of values output by the plurality of functional blocks over the plurality of connections;
   (c) comparing the target data to reference data associated with a reference system for the DSP program to determine disparities between the target and reference data; and
   (d) displaying the plurality of connection elements in selected colors among a plurality of colors to visually represent the disparities between the target and reference data.

2. A method of displaying a target design in a graphical development environment, the method comprising:
   (a) displaying a graphical representation of at least a portion of a target design on a computer display, wherein the target design includes at least one functional block configured to output a signal, and wherein the graphical representation of the portion of the target design includes a connection element representing a signal path over which the signal is output by the functional block;
   (b) comparing at least one target value of the signal that is captured for the target design with at least one reference value for the signal to determine a disparity between the target and reference values; and
   (c) visually representing the disparity between the target and reference values in association with the connection element in the graphical representation of the portion of the target design.

3. The method of claim 2, wherein the target design comprises a software design for a digital signal processor (DSP) program.

4. The method of claim 2, wherein visually representing the disparity includes highlighting the connection element.

5. The method of claim 4, wherein highlighting the connection element includes controlling a display attribute of the connection element selected from the group consisting of color, pattern, thickness, animation and combinations thereof.

6. The method of claim 5, wherein controlling the display attribute of the connection element includes selecting from among a set of display attribute values based upon the disparity, wherein each display attribute value is associated with at least one of a range of disparity magnitudes and a range of disparity types.

7. The method of claim 6, further comprising displaying a legend that visually represents the association of each display attribute value with a range of disparity magnitudes or types.

8. The method of claim 2, wherein comparing the target value to the reference value includes:
 (a) calculating a difference between the target value and the reference value; and
 (b) normalizing the difference.

9. The method of claim 2, wherein comparing the target value to the reference value includes comparing the target and reference values in at least one of a time domain and a frequency domain.

10. The method of claim 2, wherein comparing the target value to the reference value includes correlating the disparity to a disparity type selected from the group consisting of time shift, amplitude scaling, DC offset, linear transformation, nonlinear transformation, and uncorrelated noise.

11. The method of claim 2, wherein the reference value to which the target value is compared is generated from a reference system.

12. The method of claim 11, wherein the reference system comprises a reference specification.

13. The method of claim 11, wherein the reference system comprises a simulatable reference system, the method further comprising generating the reference value by performing simulation of the simulatable reference system.

14. The method of claim 11, wherein the reference system comprises a hardware reference system, the method further comprising generating the reference value by capturing the reference value during operation of the hardware reference system.

15. The method of claim 2, further comprising generating the target value by performing simulation of the target design.

16. The method of claim 2, further comprising generating the target value by capturing the target value during execution of the target design on a hardware device.

17. The method of claim 2, further comprising displaying additional data associated with the disparity in response to user input directed to the connection element.

18. The method of claim 17, further comprising generating a plot associated with the disparity in response to user input.

19. The method of claim 2, further comprising, in response to user input to drill down into the target design:
 (a) displaying graphical representations of a plurality of subcomponents for the first functional block, the plurality of subcomponents including a second functional block configured to output a second signal during operation of the target design, and a second signal path over which the second signal is output by the second functional block, wherein displaying the graphical representations of the plurality of subcomponents includes displaying a second connection element associated with the second signal path; and
 (b) visually representing disparities between target and reference values associated with the second signal path in association with the second connection element.

20. The method of claim 19, further comprising, prior to receiving the user input to drill down into the target design and displaying graphical representations of the plurality of subcomponents for the first functional block, visually representing in association with the graphical representation of the first functional block that a disparity exists between target and reference values associated with the second signal path.

21. The method of claim 2, wherein comparing the at least one target value of the signal with the at least one reference value includes comparing a plurality of target values of the signal with a plurality of reference values to determine disparities between the target and reference values over time, the method further comprising displaying an animation in association with the connection element to visually represent the disparities between target and reference values over time.

22. The method of claim 2, further comprising disabling the visual representation of the disparity between the target and reference values in response to user input indicating that the disparity is not relevant.

23. The method of claim 2, wherein the functional block is configured to output a plurality of signals, and wherein the connection element represents a plurality of signal paths over which the plurality of signals are output by the functional block.

24. An apparatus, comprising:
 (a) a memory and at least one processor;
 (b) a target design resident in the memory and including at least one functional block configured to output a signal over a signal path; and
 (c) program code configured to be executed by the processor to display a graphical representation of at least a portion of the target design in a graphical development environment by displaying a graphical representation of the functional block and a connection element representing the signal path over which the signal is output by the functional block, comparing at least one target value of the signal that is captured for the target design with at least one reference value for the signal to determine a disparity between the target and reference values, and visually representing the disparity between the target and reference values in association with the connection element in the graphical representation of the portion of the target design.

25. The apparatus of claim 24, wherein the target design comprises a software design for a digital signal processor (DSP) program.

26. The apparatus of claim 25, wherein the program code is configured to visually represent the disparity by highlighting the connection element.

27. The apparatus of claim 26, wherein the program code is configured to highlight the connection element by controlling a display attribute of the connection element selected from the group consisting of color, pattern, thickness, animation and combinations thereof.

28. The apparatus of claim 27, wherein the program code is configured to control the display attribute of the connection element by selecting from among a set of display attribute values based upon the disparity, wherein each display attribute value is associated with at least one of a range of disparity magnitudes and a range of disparity types.

29. The apparatus of claim 28, the program code is further configured to display a legend that visually represents the association of each display attribute value with a range of disparity magnitudes or types.

30. The apparatus of claim 24, wherein the program code is configured to compare the target value to the reference value by calculating a difference between the target value and the reference value, and normalizing the difference.

31. The apparatus of claim 24, wherein the program code is configured to compare the target value to the reference value by comparing the target and reference values in at least one of a time domain and a frequency domain.

32. The apparatus of claim 24, wherein the reference value to which the target value is compared is generated from a reference system.

33. The apparatus of claim 32, wherein the reference system comprises a reference specification.

34. The apparatus of claim 32, wherein the reference system comprises a simulatable reference system, and wherein the program code is further configured to generate the reference value by performing simulation of the simulatable reference system.

35. The apparatus of claim 32, wherein the reference system comprises a hardware reference system, and wherein the program code is further configured to generate the reference value by capturing the reference value during operation of the hardware reference system.

36. The apparatus of claim 24, wherein the program code is further configured to generate the target value by performing simulation of the target design.

37. The apparatus of claim 24, wherein the program code is further configured to generate the target value by capturing the target value during execution of the target design on a hardware device.

38. The apparatus of claim 24, wherein the program code is further configured to display additional data associated with the disparity in response to user input directed to the connection element.

39. The apparatus of claim 38, wherein the program code is configured to generate a plot associated with the disparity in response to user input.

40. The apparatus of claim 24, wherein the program code is further configured to, in response to user input to drill down into the target design, display graphical representations of a plurality of subcomponents for the first functional block, wherein the plurality of subcomponents includes a second functional block configured to output a second signal during operation of the target design, and a second signal path over which the second signal is output by the second functional block, wherein the program code is configured to display the graphical representations of the plurality of subcomponents by displaying a second connection element associated with the second signal path, and wherein the program code is further configured to visually represent disparities between target and reference values associated with the second signal path in association with the second connection element.

41. The apparatus of claim 40, wherein the program code is configured to, prior to receiving the user input to drill down into the target design and displaying graphical representations of the plurality of subcomponents for the first functional block, visually represent in association with the graphical representation of the first functional block that a disparity exists between target and reference values associated with the second signal path.

42. The apparatus of claim 24, wherein the program code is configured to compare the at least one target value of the signal with the at least one reference value by comparing a plurality of target values of the signal with a plurality of reference values to determine disparities between the target and reference values over time, and wherein the program code is further configured to display an animation in association with the connection element to visually represent the disparities between the target and reference values over time.

43. The apparatus of claim 24, wherein the program code is further configured to disable the visual representation of the disparity between the target and reference values in response to user input indicating that the disparity is not relevant.

44. A program product, comprising:
(a) program code configured to display a graphical representation of at least a portion of a target design in a graphical development environment, wherein the target design includes at least one functional block configured to output a signal over a signal path, the program code further configured to display a graphical representation of the functional block and a connection element representing the signal path over which the signal is output by the functional block, compare at least one target value of the signal that is captured for the target design with at least one reference value for the signal to determine a disparity between the target and reference values, and visually represent the disparity between the target and reference values in association with the connection element in the graphical representation of the portion of the target design; and
(b) a recordable computer readable medium bearing the program code.

* * * * *